May 15, 1945.  R. W. W. SANDERSON  2,375,875

ELECTRIC PRIMARY BATTERY

Filed Nov. 21, 1942

INVENTOR
ROGER WILLIAM WHALEY SANDERSON

BY

ATTORNEY

Patented May 15, 1945

2,375,875

UNITED STATES PATENT OFFICE 2,375,875

ELECTRIC PRIMARY BATTERY

Roger William Whaley Sanderson, London W. 2, England, assignor to The General Electric Company Limited, London, England Application November 21, 1942, Serial No. 466,407
In Great Britain September 17, 1941

9 Claims. (Cl. 136—111)

This invention relates to electric primary batteries of the type comprising a plurality of individual cells, each of which is of a flat form, contained within a single casing and connected in series by the contact of the cathode (or anode) of each cell with the anode (or cathode) of an adjacent cell.

An object of the invention is to provide a battery of the type which is cheap to construct and yet satisfactory in operation.

Further objects and advantages of the invention will be apparent from the following description of one embodiment described by way of example, with reference to the accompanying drawing, wherein.

Figure 1:
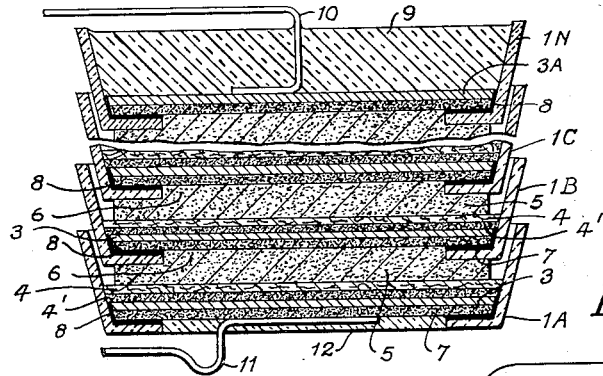
Figure 1 is a section of the improved battery partially assembled.
Figure 2:
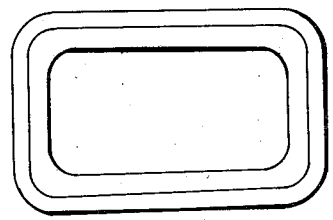
Figure 2 is a plan on a smaller scale of a member thereof.
Figure 5:
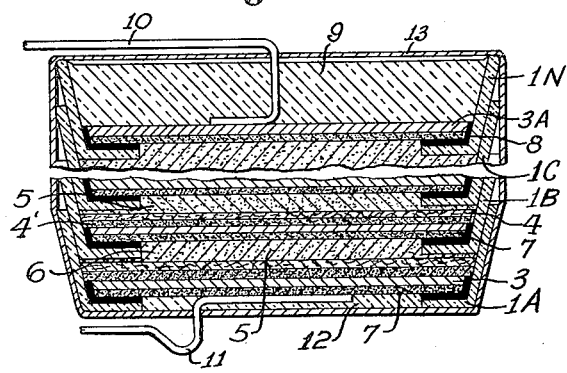
Figure 5 is a central longitudinal sectional view of a completed battery of the type shown in Fig. 3.

As shown in Figures 1 and 2, the casing of the battery consists of a set of slightly tapered annular bodies of insulating material nesting one within another; and each individual cell is contained between the bottom of one annular body and the bottom of the annular body nesting within it. Each annular body is a shallow rectangular dish with rounded corners and outwardly sloping sides, most of the bottom being removed. The longer side of the rectangle may be conveniently about 30 mm., the shorter side about 20 mm. and the depth of the dish about 3 mm. The body is preferably moulded of a plastic such as polyethylene or other suitable chemically resistant and electrically insulating plastic, the thickness being related to the material so that the body is slightly elastic.

In Figure 1 the annular bodies are denoted by IA, IB ... IN, and each body except the lowest nests within the body immediately below it.

On the bottom of each annular body is placed in the order stated (1) a zinc plate 3 coated in known manner on its underside with a conducting layer 7 (e. g. of carbon) that protects the zinc from the electrolyte. The layer may be formed by spraying the zinc with graphite suspended in a suitable binder, (2) an absorbent layer 4, which may be bibulous paper, coated with cereal 4' containing the electrolyte, (3) a layer of 5 of "mix" of the usual type containing carbon and manganese dioxide. In building up the battery, enough mix is provided in each annular body to ensure that when the next body is nested in it, the mix protrudes through the bottom of the next annular body, as shown in the Figure 1 at 6, and makes contact with the layer 7 on the zinc in the next annular body.

The positive (top) contact 3A of the pile consists of a coated zinc 3A only, contained in the annular body IN, the space, occupied in other rings by paper, mix, etc., being filled with suitable insulating compound 9, through which one terminal wire 10 projects. The other terminal wire 11 is bonded with the coating 7 of the zinc plate 3 in the annular body IA, the aperture in which may be filled with an insulating layer 12.

Figure 4:
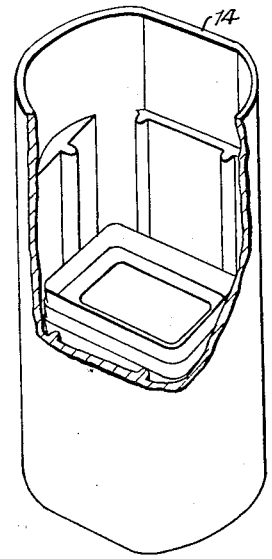
Figure 4 is a view of a partly completed battery in an outer casing which is shown partly broken away.
Figure 3:
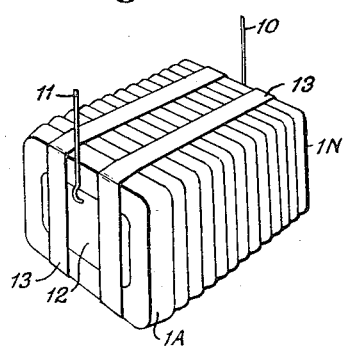
Figure 3 is a view of a completed battery.

The whole pile may be retained under suitable pressure, either by paper strips or other binding material 13 as shown in Figure 3, or in a suitable containing casing from the ends of which pressure may be applied. Such a casing, which may be moulded of a plastic, is denoted by 14 in Figure 4.

The annular bodies, if suitably constructed, will nest into each other so closely that the junctions are liquid tight. On the other hand they will not be gas tight; if gas is developed in a cell, it can escape through such a junction. In order to make each cell liquid tight and to prevent electrolyte leaking from one cell to the next, it may be necessary to use adhesive, e. g. at 8, between the layer 7 and the bottom of the ring on which it rests.

I claim:

1. An electric primary battery of the type comprising a plurality of individual cells in which all the electrodes are flat plates, said cells being contained within a single casing and connected in series by the contact of the cathode (or anode) of each cell with the anode (or cathode) of an adjacent cell, characterised in that said casing consists of a set of annular bodies of insulating material with slightly tapered resilient side walls partially telescopically wedged one within another, and that each individual cell is contained between the bottom of one of said annular bodies and the bottom of another of said annular bodies that is nesting within said one of the bodies.

2. An electric primary battery of the type comprising a plurality of individual cells in which all the electrodes are flat plates, said cells being contained within a single casing and connected in series by the contact of the cathode (or anode) of each cell with the anode (or cathode) of an adjacent cell, characterised in that said casing consists of a set of annular bodies of moulded plastic material with slightly tapered resilient side walls partially telescopically wedged one within another, and that each individual cell is contained between the bottom of one of said annular bodies and the bottom of another of said annular bodies that is nesting within said one of the bodies.

3. An electric primary battery of the type comprising a plurality of individual cells in which all the electrodes are flat plates, said cells being contained within a single casing and connected in series by the contact of the cathode (or anode) of each cell with the anode (or cathode) of an adjacent cell, characterised in that said casing consists of a set of slightly tapered annular bodies, each in the form of a shallow dish of insulating material having smooth thin outwardly sloping sides and all moulded plastic except the border portion of its bottom removed, said dishes nesting tightly one within another by virtue of their elasticity, and that each individual cell is contained between the bottom of one of said dishes on which one electrode of said cell rests and the bottom of another of said dishes that is nesting within said one of the dishes.

4. A battery as claimed in claim 3, characterised in that a seal of adhesive material is disposed between the inner surface of each of said dishes and the border portion of the electrode that abuts against said surface.

5. An electric primary battery comprising a casing consisting of a set of slightly tapered smooth thin annular bodies of moulded plastic insulating material nesting tightly one within another by virtue of their elasticity, individual cells having flat electrodes contained respectively between the adjacent bottoms of said annular bodies, similar flat electrodes of each cell resting on the bottoms of each body, said cells being electrically connected in series by the contact of the cathode and the anode of each of said cells except the end ones with respectively the anode of one and the cathode of the other of the two adjacent cells, and means maintaining said nested annular bodies under compression acting along the set of bodies.

6. A battery as claimed in claim 5, wherein said means are constituted by a binding disposed around said casing from end to end thereof.

7. A battery as claimed in claim 5, wherein said casing is compressed within an outer casing.

8. An electric battery comprising a plurality of hollow, open-ended, electrically non-conductive, identical bodies nestedly stacked in alignment end-to-end, means to compress said stack of bodies axially so that they mutually form a multi-part hollow casing having liquid-tight but gas-pervious joints between the bodies, and a plurality of flat cells each including two electrodes, an electrolyte, and a depolarizing mix, one electrode of each cell being in one body and the other electrode thereof being in a contiguous body and the electrolyte and depolarizing mix of each cell being disposed between said electrodes and at the joint of the two contiguous bodies whereby gaseous decomposition products can escape but the electrolyte is prevented from leaking, the side walls of the bodies being slightly tapered and resilient and the bodies being partially telescopically wedged into one another.

9. An electric battery comprising a plurality of hollow, open-ended, electrically non-conductive, identical bodies nestedly stacked in alignment end-to-end, means to compress said stack of bodies axially so that they mutually form a multi-part hollow casing having liquid-tight but gas-pervious joints between the bodies, and a plurality of flat cells each including two electrodes, an electrolyte, and a depolarizing mix, one electrode of each cell being in one body and the other electrode thereof being in a contiguous body and the elctrolyte and depolarizing mix of each cell being disposed between said electrodes and at the joint of the two contiguous bodies whereby gaseous decomposition products can escape but the electrolyte is prevented from leaking, the side walls of the bodies being slightly tapered, thin and of plastic material and the bodies being partially telescopically wedged into one another.

ROGER WILLIAM WHALEY SANDERSON.